United States Patent [19]

Pedicini

[11] Patent Number: 5,691,074
[45] Date of Patent: Nov. 25, 1997

[54] DIFFUSION CONTROLLED AIR VENT FOR A METAL-AIR BATTERY

[75] Inventor: Christopher S. Pedicini, Marietta, Ga.

[73] Assignee: AER Energy Resources, Inc., Atlanta, Ga.

[21] Appl. No.: 544,707

[22] Filed: Oct. 18, 1995

[51] Int. Cl.⁶ .................................................. H01M 12/08
[52] U.S. Cl. .................... 429/27; 429/34; 429/82; 429/83
[58] Field of Search .................... 429/27, 71, 82, 429/83, 34; D13/103; H01N 12/06, 12/08

[56] References Cited

U.S. PATENT DOCUMENTS

| | | | |
|---|---|---|---|
| 3,072,284 | 1/1963 | Luhman | 220/44 |
| 3,436,270 | 4/1969 | Oswin et al. | 136/120 |
| 3,532,548 | 10/1970 | Stachurski | 136/164 |
| 3,600,233 | 8/1971 | Coffey et al. | 136/166 |
| 3,615,860 | 10/1971 | Teriecke | 136/107 |
| 3,744,516 | 7/1973 | Rowe | 137/587 |
| 3,871,920 | 3/1975 | Grebier et al. | 136/86 |
| 3,909,302 | 9/1975 | Mermelstein | 136/177 |
| 3,975,210 | 8/1976 | Warnock | 136/86 |
| 3,977,901 | 8/1976 | Buzzelli | 136/86 |
| 4,112,198 | 9/1978 | Przybyla et al. | 429/27 |
| 4,112,199 | 9/1978 | Dunlop et al. | 429/29 |
| 4,118,544 | 10/1978 | Przybyla et al. | 429/27 |
| 4,152,489 | 5/1979 | Chottiner | 429/27 |
| 4,246,324 | 1/1981 | de Nora et al. | 429/17 |
| 4,298,666 | 11/1981 | Taskier | 429/206 |
| 4,359,510 | 11/1982 | Taskier | 429/144 |
| 4,484,691 | 11/1984 | Lees | 220/89 |
| 4,521,497 | 6/1985 | Tamminen | 429/27 |
| 4,626,482 | 12/1986 | Hamlen et al. | 429/27 |
| 4,745,038 | 5/1988 | Brown | 429/27 |
| 4,913,983 | 4/1990 | Chelky | 429/27 X |
| 4,950,561 | 8/1990 | Niksa et al. | 429/27 |
| 5,024,904 | 6/1991 | Curiel | 429/27 |
| 5,084,364 | 1/1992 | Quaadvliet | 429/34 |
| 5,183,222 | 2/1993 | Ramsey | 244/53 R |
| 5,191,274 | 3/1993 | Lloyd et al. | 429/27 X |
| 5,196,275 | 3/1993 | Goldman et al. | 429/27 |
| 5,208,526 | 5/1993 | Goldman et al. | 320/2 |
| 5,260,144 | 11/1993 | O'Callaghan | 429/14 |
| 5,306,579 | 4/1994 | Shepard, Jr. et al. | 429/40 |
| 5,318,861 | 6/1994 | Harats et al. | 429/21 |
| 5,328,777 | 7/1994 | Bentz et al. | 429/27 |
| 5,328,778 | 7/1994 | Woodruff et al. | 429/27 |
| 5,354,625 | 10/1994 | Bentz et al. | 429/17 |
| 5,356,726 | 10/1994 | Pedecini | 429/27 |
| 5,362,577 | 11/1994 | Pedicini | 429/27 |
| 5,366,822 | 11/1994 | Korall et al. | 429/27 |
| 5,387,477 | 2/1995 | Cheiky | 429/26 |
| 5,418,080 | 5/1995 | Korall et al. | 429/27 |
| 5,447,805 | 9/1995 | Harats et al. | 429/27 |
| 5,506,067 | 4/1996 | Tinker | 429/27 |

FOREIGN PATENT DOCUMENTS

| | | |
|---|---|---|
| 0 294 327 | of 1988 | European Pat. Off. |
| 1 575 640 | of 1969 | France |
| 90 11625 A | of 1990 | WIPO |

OTHER PUBLICATIONS

The Search for Better Batteries, IEEE Spectrum May 1995 pp. 51–56.

*Primary Examiner*—Stephen Kalafut
*Attorney, Agent, or Firm*—Jones & Askew, LLP

[57] ABSTRACT

A ventilation system for a metal-air battery having a housing for enclosing at least one metal-air cell. The housing has at least one air inlet opening and at least one air outlet opening. A fan is positioned to force air into the air inlet opening and out of the air outlet opening when the fan is turned on. The openings are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off.

27 Claims, 1 Drawing Sheet

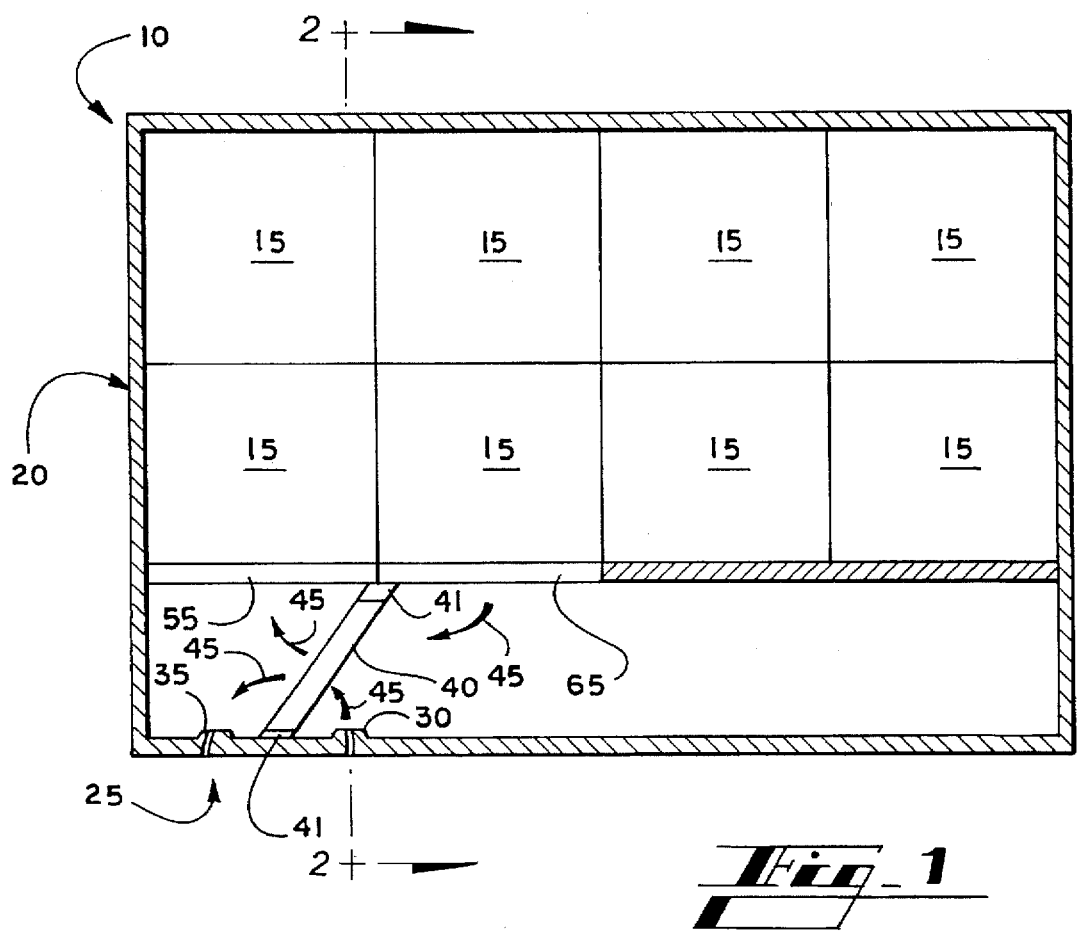
_Fig_1
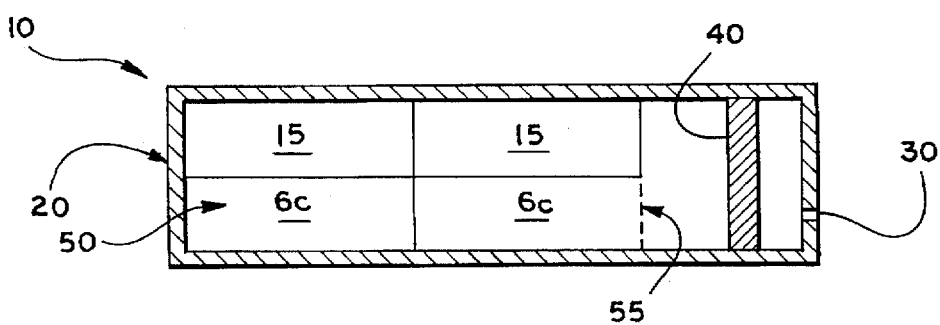
_Fig_2
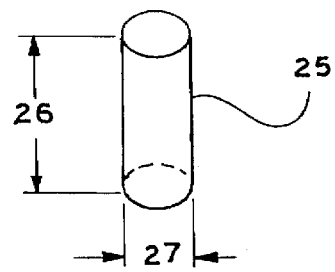
_Fig_3

DIFFUSION CONTROLLED AIR VENT FOR A METAL-AIR BATTERY

RELATED APPLICATIONS

Application Ser. No. 08/299,997, entitled "A Portable Battery With A Retrofitting Projection And Wrist Rest For Use Externally Of An Electronic Device," filed Sep. 1, 1994, assigned to AER Energy Resources, Inc., the assignee of the present application, is attached hereto as Appendix A. Application Ser. No. 08/299,997 discloses a preferred metal-air battery pack for use with the present invention and is incorporated herein by reference.

TECHNICAL FIELD

The present invention relates generally to batteries, and more particularly relates to a ventilation system for a metal-air battery.

BACKGROUND OF THE INVENTION

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air battery cells are often arranged in multiple cell battery packs within a common housing to provide a sufficient amount of power output. The result is a relatively light-weight battery.

To operate a metal-air battery cell, it is necessary therefore to provide a supply of oxygen to the air cathodes of the cells. Some prior systems sweep a continuous flow of new ambient air across the air cathodes at a flow rate sufficient to achieve the desired power output. Such an arrangement is shown in U.S. Pat. No. 4,913,983 to Cheiky. Cheiky uses a fan within the battery housing to supply a flow of ambient air to a pack of metal-air battery cells. When the battery is turned on, an air inlet and an air outlet are opened and the fan is activated to create the flow of air into, through, and out of the housing.

One problem with a metal-air battery is that the ambient humidity level can cause the battery to fail. Equilibrium vapor pressure of the metal-air battery results in an equilibrium relative humidity that is typically about 45 percent. If the ambient humidity is greater than the equilibrium humidity within the battery housing, the battery will absorb water from the air through the cathode and fail due to a condition called flooding. Flooding may cause the battery to burst. If the ambient humidity is less than the equilibrium humidity within the battery housing, the metal-air battery will release water vapor from the electrolyte through the air cathode and fail due to drying out. The art, therefore, has recognized that an ambient air humidity level differing from the humidity level within the battery housing will create a net transfer of water into or out of the battery. These problems are particularly of concern when the battery is not in use, because the humidity tends to either seep into or out of the battery housing over an extended period of time.

Another problem associated with metal-air batteries is the transfer of carbon dioxide from ambient air into the battery cell. Carbon dioxide tends to neutralize the electrolyte, such as potassium hydroxide. In the past, carbon dioxide absorbing layers have been placed against the exterior cathode surface to trap carbon dioxide. An example of such a system is shown in U.S. Pat. No. 4,054,725.

Maintaining a battery cell with proper levels of humidity and excluding carbon dioxide has generally required a sealed battery housing. As discussed above, however, prior art systems such as that disclosed by Cheiky, have used a fan of some sort to force ambient air through the battery housing during use. Large openings are provided to permit the in-flow and out-flow of air. These openings are generally sealed during non-use by a mechanical air door. If the air door is not present or not shut during non-use, large amounts of ambient air would seep into the housing. This flow of air would cause the humidity and carbon dioxide problems within the housing as discussed above. The oxygen in the ambient air also would cause the cell to discharge, thereby leading to "leakage" current and a reduction in cell efficiency and lifetime.

Even with the use of air doors, however, a certain amount of oxygen and contaminates tend to seep into the cell during non-use. Some leakage current is therefore inevitable. Although the air doors limit this leakage current and the other problems discussed above, the use of the air doors increases the complexity of the battery housing itself and increases the cost and time of manufacture of the overall battery.

Air doors have not been needed in some applications of metal-air cells, such as shown in include U.S. Pat. No. 4,118,544 to Przybyla. Przybyla describes a primary metal-air button cell used with watches and hearing aids. Such cells operate during a single, continuous discharge at very low current levels. The cell has one or more passageways sized, for example, from about 0.001–0.002 inch in diameter. The openings are intended to limit severely air access to the cathode of an individual cell such that excessive moisture vapor influx or egress to or from the cell should be prevented. The patent postulates that a partial vacuum is created within the cell as oxygen is utilized during discharge, and that such partial vacuum draws in more air. No fan moves the air.

In essence, Przybyla relies upon the use of "leakage current" to power devices with very low current demands. The battery is never turned "off." The available output power level of the cell is limited because the intake of all components of ambient air, including the concentration of oxygen, is limited. Przybyla teaches such small holes that it would be difficult to generate sufficient power to operate a device such as a laptop computer, even if multiple openings were formed. These small holes also are said to require special manufacturing techniques. Alternately, if the number of holes could be such that an ample supply of oxygen passes into the cell to meet increased power demands, an unnecessary excess of other components would also be introduced. This increased air flow would lead to the humidity and other problems discussed above.

Thus, there has been a need for a practical air manager system for a metal-air battery without the use of mechanical air doors or other mechanical sealing methods to prevent diffusion therethrough when the battery is not in use. The system should maintain a stable water vapor equilibrium across the air cathode of a metal-air cell while convectively providing new oxygen for operation of the cell at desired power levels in a simplified battery housing.

SUMMARY OF THE INVENTION

The present invention provides a ventilation system for a metal-air battery having a housing for enclosing at least one metal-air cell. The housing has at least one air inlet opening and at least one air outlet opening. A fan is positioned to force air into the air inlet opening and out of the air outlet opening when the fan is turned on. The openings are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off.

More particularly, the present invention provides a ventilation system for a metal-air battery having a preferred output current density with the fan on of about 50 to 200 ma per square inch of air cathode surface. Each opening preferably has a length to width ratio where the length is greater than about twice the width, with each opening having a length of about 0.3 to 1.5 inches and a width of about 0.03 to 0.3 inches. The openings are preferably sized in the aggregate to permit a flow rate therethrough of about 20 to 80 cubic inches per minute when forced by fan having a capacity of about 100 to 3000 cubic inches per minute.

When the fan is turned off, the openings are sized to slow the rate of diffusion therethrough such that the drain current density is less than 1 ma per square inch of air cathode surface. The preferred ratio of the output current density to the drain current density of the battery is at least 100 to 1. The flow rate with the fan off is preferably about 0.01 to 0.2 cubic inches per minute or less.

Thus, it an object of the present invention to provide an improved ventilation system for a metal-air cell or battery.

It is a further object of the present invention to provide an improved method for supplying reactant air to a metal-air cell or battery.

It is a further object of the present invention to provide an air manager apparatus and method that maintains a more stable water vapor equilibrium across the air cathode of a metal-air cell while still providing new oxygen needed for operation of the cell at desired power levels.

It is a further object of the present invention to provide an air manager system that does not require a mechanical air door.

It is a still further object of the present invention to provide an air vent for a metal-air battery housing that substantially eliminates diffusion therein when the fan is turned off.

Other objects, features and advantages of the present invention will become apparent upon reviewing the following description of preferred embodiments of the invention, when taken in conjunction with the drawings and the appended claims.

BRIEF DESCRIPTION OF THE DRAWINGS

FIG. 1 is a diagrammatic top view of the battery housing embodying the present invention, showing the position of the cells, the fan, and the air openings, in combination with the direction of the flow of air with respect to the housing.

FIG. 2 is a vertical cross sectional view taken along line 2—2 of FIG. 1.

FIG. 3 is a diagrammatic pictorial view of a ventilation opening.

DETAILED DESCRIPTION

Referring now in more detail to the drawings, in which like numerals refer to like parts throughout the several views, FIGS. 1 and 2 show a metal-air battery pack 10 embodying the present invention. The metal-air battery 10 may be similar to that disclosed in commonly-owned Ser. No. 08/299,997 or in commonly owned U.S. Pat. No. 5,356,729 to Pedicini, which are incorporated herein by reference. The metal-air battery 10 includes a plurality of cells 15 enclosed within a housing 20. Although the use of the invention with a zinc-air battery is disclosed, this invention should be understood as being applicable to other types of metal-air battery cells.

The housing 20 isolates the cells 15 from the outside air with the exception of a plurality of ventilation openings 25. In the embodiment shown in FIGS. 1 and 2, a single air inlet opening 30 and a single air outlet 35 are utilized. As described below, the number of openings 25 is not as important as the aggregate size of the openings 25 in connection with the shape of each opening 25. The housing 20 may be any type of conventional, substantially air-tight structure.

A circulating fan 40 is provided for convective air flow both in and out of the housing 20 and to circulate and mix the gases within the housing 20. The arrows 45 shown in FIG. 1 represent a typical circulation of the gases into, out of, and within the housing 20 to provide reactant air to the cells 15. The capacity of the fan 40 depends upon the size of the housing 20 and the power demands of the battery 10. The term "fan 40" as used herein is intended to mean any device used to move air.

The fan 40 may be positioned within the housing 20 or adjacent to the housing 20 in communication with one of the openings 25. If the fan 40 is located within the housing 20, the ventilation openings 25 are positioned such that the inlet opening 30 and the outlet opening 35 are positioned on opposite sides of the fan 40. The only requirement for the positioning within the housing 20 of the fan 40 and the openings 25 is that they are in sufficiently close proximity to each other to create a convective air flow into, through, and out of the housing 20. The fan 40 may be mounted within or adjacent to the housing 20 in any convenient manner. The fan 40 is generally sealed into place by a gasket 41 or other conventional means to ensure that the low pressure and high pressure sides of the fan 40 are isolated from one another.

As is shown in FIG. 2, the plurality of cells 15 within housing 20 are arranged such that a reactant air plenum 50 is positioned under the cells 15. The air plenum 50 generally defines an air plenum inlet 55, an air passageway 60, and an air plenum outlet 65. The fan 40 is generally positioned between and isolates the air plenum inlet 55 from the air plenum outlet 65 for efficient air flow through the housing 20. An example of an air plenum design is shown in FIG. 4 of commonly-owned Ser. No. 08/299,997.

As is shown in FIG. 3, the ventilation openings 25 are preferably sized such that their length 26, i.e., the direction through the thickness of the housing 20, is greater than their width 27, i.e., the direction perpendicular to the thickness of the housing 20. By using a large enough ratio between the length 26 and the width 27 for the ventilation openings 25, it has been found that diffusion of air through the openings 25, without the assistance of the fan 40, is substantially eliminated. By "substantially eliminated," it is meant that the rate of diffusion of oxygen or contaminates through the openings 25 is so slow that humidity transfer or drain current is sufficiently small and has little appreciable impact on the efficiency or lifetime of the battery 10. The openings 25 are sufficiently long and narrow to provide a barrier to diffusion of gases therethrough when the fan 40 is turned off.

This required ratio between length 26 and width 27 is at least about two to one. These ratios are sufficient to prevent appreciable diffusion through the openings 25 when the fan 40 is turned off while permitting convective air flow therethrough when the fan 40 is turned on. The use of larger ratios between length 26 and width 27 is preferred. Depending upon the nature of the battery 10, the ratio can be more than 200 to 1.

The preferred total open area of the openings 25 depends upon the desired capacity of the battery 10. Any number of openings 25 can be used such that aggregate open area of all of the openings 25 equals this preferred total open area, with each such opening 25 having the same or similar ratios of length 26 to width 27 to provide the barrier functions. Although the use of circular openings 25 is disclosed, any conventional shape having the required ratios may be employed. Further, the openings 25 may be straight or curved in length.

In use, ambient air is drawn into the air inlet 30 by pull of the fan 40 when the fan 40 is turned on. As is shown by the arrows 45 in FIG. 1, the air is then drawn through the fan 40 and into the air plenum 50. The air enters the air plenum 50 through air plenum inlet 55, travels though the pathway 60 to provide a reactant air flow for the cells 15, and exits via the air plenum outlet 65. The air is then again drawn into the fan 40 where it either mixes when fresh incoming ambient air or is forced out of the housing 20 via air outlet 35. When the fan 40 is turned off, the rate of diffusion of air through the openings 25 is reduced to acceptable levels such that a mechanical air door is not required.

By way of example, in a preferred embodiment of a battery pack 10 designed to power a portable computer (not shown), an 8 volt battery 10 with 8 battery cells 15 is used (an up-converter (not shown) also may be used). Each cell 15 has an output of about 1 volt or slightly higher at about 1 to 4 amps. Each cell 15 has an exposed cathode area (not shown) of about 18 to 22 square inches for a total exposed cathode area of about 144 to 176 square inches. The battery 10 therefore has a current density of about 50 to 200 ma per square inch of cathode surface when the fan is turned on. The fan 40 has a capacity of about 100 to 3000 cubic inch per minute.

In order to pull a gas flow through the housing 20 of about 20 to 80 cubic inches per minute when the fan is turned on, the openings 25 are sized with a length 26 of about 0.3 to 1.5 inches, with about 0.5 inch preferred, and a width 27 of about 0.03 to 0.3 inches, with about 0.125 inch preferred. The total open area of each opening 25 is therefore about 0.0007 to 0.5 square inches, with a preferred ratio of length 26 to width 27 of about 4 to 1.

When the fan 40 is turned off, the gas flow rate is reduced to about 0.01 to 0.2 cubic inches per minute or less, with a leakage current of less than 1 ma. The ratio of output current density with the fan 40 turned on to drain current density with the fan 40 turned off is expected to be at least 100 to 1 in an efficient battery 10.

It is understood that the respective sizes, capacities, densities, flow rates, and other parameters discussed above are dependent upon the overall size and power requirements of the battery 10. For example, output current density could easily run in the range of 10 to 500 ma per square inch of air cathode surface area in a conventional battery 10. It is also understood that other types of electrical devices besides computer equipment may be powered by the battery 10.

The openings 25 are also preferably sized to preferentially diffuse oxygen out of the housing 20 during recharge. Oxygen is generated at the cathode (not shown) during recharge. The openings 25 are sized in the aggregate to force oxygen out of the housing 20 when the partial pressure of oxygen within the housing 20 is at a level above the partial pressure of oxygen outside the housing 25.

It should be understood that the foregoing relates only to preferred embodiments of the present invention, and that numerous changes may be made therein without departing from the spirit and scope of the invention as defined by the following claims.

I claim:

1. A ventilation system for a metal-air battery, comprising:
   a housing for enclosing at least one metal-air cell;
   said housing having at least one air inlet opening and at least one air outlet opening; and
   a fan positioned to force said air into said air inlet opening and out of said air outlet opening when said fan is turned on;
   said openings each being sized with a length in the direction through the thickness of said housing being greater than a width in the direction perpendicular to said thickness of said housing;
   said openings being unobstructed when said fan is turned off.

2. The ventilation system for a metal-air battery of claim 1, wherein each said opening has a length to width ratio of between about 2 to 1 and 200 to 1.

3. The ventilation system for a metal-air battery of claim 1, wherein each said opening has a length to width ratio wherein said length is greater than double said width.

4. The ventilation system for a metal-air battery of claim 1, wherein each said opening has said length of about 0.3 to 1.5 inches and said width of about 0.03 to 0.3 inches.

5. The ventilation system for a metal-air battery of claim 1, wherein said fan has a capacity of about 100 to 3000 cubic inches per minute.

6. The ventilation system for a metal-air battery of claim 1, wherein said metal-air battery has a drain current density with said fan turned off of less than 1 ma per square inch of air cathode surface.

7. The ventilation system for a metal-air battery of claim 6, wherein said metal-air battery has an output current density of about 50 to 200 ma per square inch of air cathode surface when said fan is on.

8. The ventilation system for a metal-air battery of claim 1, wherein said battery's ratio of the output current density when said fan is on to the drain current density when said fan is off is at least 100 to 1.

9. The ventilation system for a metal-air battery of claim 1, wherein said openings are sized in the aggregate to permit a flow rate therethrough with said fan on of about 20 to 80 cubic inches per minute.

10. The ventilation system for a metal-air battery of claim 1, wherein said openings are sized in the aggregate to permit a flow rate therethrough with said fan off of about 0.01 to 0.2 cubic inches per minute or less.

11. The ventilation system for a metal-air battery of claim 1, wherein said housing defines a single air inlet opening and a single air outlet opening.

12. A ventilation system for a metal-air battery, comprising:
   a housing for enclosing a plurality of metal-air cells with an output current density of at least 50 ma per square inch of air cathode surface; and
   a fan within said housing;
   said housing having at least one air inlet opening and at least one air outlet opening;

said openings each being sized with a length in the direction through the thickness of said housing being greater than the width in the direction perpendicular to said thickness of said housing;

said openings being unobstructed when said fan is turned off and sized to restrict air flow into said at least one air inlet opening and out of said at least one air outlet opening when said fan is turned off such that said battery has a drain current density of less than 1 ma per square inch of air cathode surface;

said fan forcing said air into said air inlet opening and out of said air outlet opening when said fan is turned on.

13. The ventilation system for a metal-air battery of claim 12, wherein each said opening has a length to width ratio of between about 2 to 1 and 200 to 1.

14. The ventilation system for a metal-air battery of claim 12, wherein each said opening has a length to width ratio wherein said length is greater than double said width.

15. The ventilation system for a metal-air battery of claim 12, wherein said openings are sized in the aggregate to permit a flow rate therethrough with said fan off of about 0.01 to 0.2 cubic inches or less.

16. The ventilation system for a metal-air battery of claim 15, wherein said openings are sized in the aggregate to permit a flow rate therethrough with said fan on of about 20 to 80 cubic inches.

17. A housing for a metal-air battery, comprising:

said housing having at least one air inlet opening and at least one air outlet opening;

said openings each being sized with a length in the direction through the thickness of said housing being greater that double the width in the direction perpendicular to said thickness of said housing; and a fan positioned to provide convective air flow into said at least one air inlet opening and out of said at least one air outlet opening.

18. The housing for a metal-air battery of claim 17, wherein the output current density of said battery with said fan turned on is about 10 to 500 ma per square inch of air cathode surface.

19. The housing for a metal-air battery of claim 17, wherein the drain current density of said battery with said fan turned off is about 0.01 to 1 ma per square inch of air cathode surface.

20. The ventilation system for a metal-air battery of claim 12, wherein said plurality of cells cooperate to define a battery that can deliver a current of at least 7.2 amperes when said fan is turned on.

21. A ventilation system for a metal-air battery, comprising:

a housing for enclosing the metal-air battery and defining openings through said housing;

a fan cooperating with said openings;

said fan defining a first mode of operation in which said fan operates to move air into said housing through at least a first opening of said openings and out of said housing through at least a second opening of said openings to supply air to the metal-air battery;

said fan defining a second mode of operation in which said fan is inoperative and thereby ceases to move air through said openings; and said openings being unobstructed during both said first mode of operation and said second mode of operation and sized so that the leakage current of the metal-air battery during said second mode of operation is less than 1 ma.

22. The ventilation system of claim 21, wherein said openings are sized so that the metal-air battery can deliver a current of at least 7.2 amperes during said first mode of operation.

23. The ventilation system of claim 21, wherein each opening of said openings has a width that is perpendicular to the flow-path therethrough, and a length that is parallel to the flow-path therethrough, and wherein said length is greater than said width.

24. The ventilation system of claim 23, wherein said length is at least twice said width.

25. A metal-air battery, comprising:

a housing defining at least one inlet opening and at least one outlet opening therethrough and containing a fan operative when on to circulate air within said housing, and a plurality of metal-air cells operative to provide a battery output current when said fan is on;

said battery providing a discharge mode during which said fan moves air through said openings to supply air to said metal-air cells, and an idle mode during which said fan is off and said openings are unobstructed; and said openings being sized to reduce discharge of said cells when said fan is off to a leakage current that is smaller than said battery output current by at least a factor of 50.

26. A method for controlling air flow to a metal-air battery, comprising the steps of:

confining a metal-air cell within a housing, the housing defining an opening and a cross-sectional area of the opening that is perpendicular to the direction of flow through the opening;

operating a fan to move air through the opening into the housing;

precluding operation of the fan so that the fan does not move air through the opening into the housing; and maintaining the opening in an unobstructed state during the step of operating and the step of precluding such that the cross-sectional area during the operating step is identical to the cross-sectional area during the precluding step.

27. The method of claim 26, wherein the ratio of current that the metal-air battery can deliver during the operating step to the leakage current of the metal-air battery during the precluding step is greater than 50.

* * * * *